United States Patent [19]

Boehm et al.

[11] Patent Number: 4,797,328

[45] Date of Patent: Jan. 10, 1989

[54] SOFT-SOLDER ALLOY FOR BONDING CERAMIC ARTICLES

[75] Inventors: Wolfgang Boehm, Alzenau-Albstadt; Juergen Hausselt, Langenselbold; Wolfgang Weise, Frankfurt am Main; Willi Malikowsik, Aschaffenburg, all of Fed. Rep. of Germany

[73] Assignee: Degussa Aktiengesellschaft, Frankfurt am Main, Fed. Rep. of Germany

[21] Appl. No.: 15,259

[22] Filed: Feb. 17, 1987

[30] Foreign Application Priority Data

Feb. 19, 1986 [DE] Fed. Rep. of Germany ....... 3605170

[51] Int. Cl.$^4$ ..................... B32B 15/01; B32B 15/04; C22C 11/00; C22C 13/00
[52] U.S. Cl. .................................. 428/621; 228/121; 228/122; 228/263.12; 420/557; 420/563; 420/566; 428/457; 428/645; 428/646
[58] Field of Search .............. 420/557, 563, 566, 573; 428/621, 643, 645, 646, 457; 228/121, 263.12, 122

[56] References Cited

U.S. PATENT DOCUMENTS 2,805,944  9/1957  Bender .............................. 420/573
3,484,210  12/1969  Pinter ................................ 420/557

FOREIGN PATENT DOCUMENTS 448241  8/1975  U.S.S.R. .............................. 420/566

Primary Examiner—John P. Sheehan
Assistant Examiner—Robert L. McDowell
Attorney, Agent, or Firm—Beveridge, DeGrandi & Weilacher

[57] ABSTRACT

Soft-solder alloys for connecting ceramic parts without permetallization comprising 86 to 99% lead or tin, 0 to 13% silver and/or copper, 0 to 10% indium and 1 to 10% titanium and/or zirconium.

14 Claims, No Drawings

SOFT-SOLDER ALLOY FOR BONDING CERAMIC ARTICLES

The present invention relates to the use of a soft-solder alloy for bonding ceramic parts together, and for bonding ceramic articles to metal parts, and in particular, pertains to bonding aluminum oxide parts to copper parts.

The utilization of ceramic components in modern technology is dependent to a large extent on having suitable bonding and soldering methods available.

Of the many known methods for bonding ceramic parts together or for bonding such parts to metals, the process of metallizing of ceramics in accordance with the manganese-molybdenum method with subsequent connection via the metallic layers by soldering is the most frequently used method at the present time. In this method, a suspension layer approximately 25–50 $\mu$m thick and formed of 10–20% manganese powder and 80–90% molybdenum powder is applied onto the ceramics. A partial oxidation of the powder occurs during the subsequent welding under hydrogen with appropriate point of condensation. The oxides form a compound (spinels) with the ceramics. A layer of nickel is then applied for a better wetting via the solders. This method is complicated and expensive on account of the working steps required for the process.

Recently, active solders having a silver-copper base and containing titanium, zirconium or hafnium additives are being used more and more for a direct bonding of ceramics to metals.

This allows expansion alloys (FeNi and FeNiCo alloys) and e.g. $Al_2O_3$ to be bonded together in a vacuum tight manner with good strength properties under a protective gas or in a vacuum.

Previous attempts to bond, for example, copper and alumina-components with these hard solders has proven to be quite difficult. For instance, the AgCu solder melt strongly dissolves the copper of the component at temperatures above the eutectic point, depending on the composition. This can result in a complete dissolution of very thin copper components (e.g. membranes). On the other hand, the difference in the thermal coefficients of expansion between copper and aluminum oxide is very great. The effect of this difference is manifested during cooling after the soldering in the formation of stresses in the border zones of the bonding layer. The strength of the bond is reduced by the microcracks which occur as a result of the stresses. A substantial number of the soldered specimens therefore exhibit vacuum leaks.

There is described in U.S. Pat. No. 3,001,269 solder compositions for the direct soldering of ceramics which contain, in addition to 4 to 10 weight % titanium and/or zirconium, an amount of 10 to 85 weight % of lead, and the remainder is copper, silver of nickel. In practice, these solders contain 15 to 35 weight % lead and 60 to 80% copper, silver and nickel. These solders are not suitable for soldering, for example, copper with aluminum oxide. For the bonding of quartz glass to metallic parts of molybdenum, tungsten or tantalum, solders of tin with 2 to 3% by weight of titanium can be used in accordance with DE-AS No. 15 33 542.

It is therefore an object of the present invention to provide soft-solder alloys for bonding ceramic parts together and for bonding ceramic parts to metallic parts, and especially to provide for alloys used in bonding aluminum oxide parts to copper parts, which alloys can be used without a previous metallizing of the ceramic surfaces, which do not dissolve copper and other metal alloys and which can also compensate for rather large differences in the expansion behavior of the parts to be soldered together.

A feature of the present invention resides in a soft-solder alloy which comprises 86 to 99% lead or tin, 0 to 13% silver and/or copper, 0 to 10% indium and 1 to 10% titanium and/or zirconium.

The following soft-solder alloy compositions are preferred embodiments of the invention:
(a) 86–93% lead, 1–6% silver and 1–10% titanium.
(b) 86–92% lead, 4–10% indium and 1–10% titanium.
(c) 88–94% lead, 2–6% copper and 1–10% titanium.
(d) 90–99% lead and 1–10% titanium.
(e) 86–95% tin, 1–13% silver and 1–10% titanium.
(f) 86–95% tin, 1–12% silver, 1–5% copper and 1–10% titanium.

The compositions of the invention consist essentially of the indicated ingredients expressed as metals in the indicated weight percent ranges.

These alloys can be easily melted and processed into formed parts, e.g., into foils or sheets up to 100 $\mu$m thick and wires up to 500 $\mu$m thick. They exhibit working temperatures in a range of 700° to 950° C.

Aluminum oxide tubes $\phi 5.5 \times 8 \times 4.5$ mm$^3$ and copper electrodes were directly soldered in soldering tests with a solder of 96% lead and 4% titanium under protective gas (argon). In the subsequently conducted tests, strengths of 500 to 800 N were determined. In solderings using solders with a composition of 86% Pb, 10% In, 4% Ti, strengths of 640–1050 N were achieved The measured leakage rates were in the vicinity of $10^{-8}$ mbar $1s^{-1}$.

It was also possible to solder steel to oxide and non-oxide ceramics with these solders without tension cracks being observable in the ceramics The strengths of the bonds were in the vicinity of 35 N/mm$^2$.

The alloy compositions of this invention can be formed by any suitable techniques known in the art. The bonding and soldering technique used in accordance with the invention include any conventional method used for bonding ceramics and metal parts.

Further variations and modifications of the foregoing will be apparent to those skilled in the art and are intended to be encompassed by the claims appended hereto.

We claim:

1. A soft-solder alloy for bonding ceramic parts together for bonding a ceramic part to a metallic part consisting of 86 to 99% lead, 0 to 13% silver, 0 to 10% indium and 1 to 10% of a member selected from the group consisting of titanium, zirconium, and mixtures thereof.

2. The soft-solder alloy according to claim 1, consisting of 86 to 93% lead, 1 to 6% silver and 1 to 10% titanium.

3. A ceramic article comprising at least two ceramic surfaces bonded together with the alloy of claim 2.

4. An article containing at least one ceramic component bonded to a metal component by the alloy of claim 2.

5. The soft-solder alloy according to claim 1, consisting of 86 to 92% lead, 4 to 10% indium and 1 to 10% titanium.

6. A ceramic article comprising at least two ceramic surfaces bonded together with the alloy of claim 5.

7. An article containing at least one ceramic component bonded to a metal component by the alloy of claim 3.

8. The soft-solder alloy according to claim 1, consisting of 90% to 99% lead and 1 to 10% titanium.

9. A ceramic article comprising at least two ceramic surfaces bonded together with the alloy of claim 8.

10. An article containing at least one ceramic component bonded to a metal component by the alloy of claim 5.

11. A ceramic article comprising at least two ceramic surfaces bonded together with the alloy of claim 1.

12. An article containing at least one ceramic component bonded to a metal component by the alloy of claim 1.

13. A ceramic article comprising at least two ceramic surfaces bonded together with a soft-solder alloy consisting of 86 to 95% tin, 1 to 13% silver and 1 to 10% titanium.

14. An article containing at least one ceramic component bonded to a metal component by a soft-solder alloy consisting of 86 to 95% tin, 1 to 13% silver 1 to 10% titanium.

* * * * *